United States Patent [19]

Doriguzzi et al.

[11] 4,218,281
[45] Aug. 19, 1980

[54] MANUFACTURING PROCESS FOR AN ELECTROOPTIC DISPLAY DEVICE

[75] Inventors: Rino Doriguzzi, Dottingen; Markus Egloff, Wettingen; Meinolph Kaufmann, Fislisbach; Terry J. Scheffer, Forch, all of Switzerland

[73] Assignee: BBC Brown, Boveri & Company, Limited, Baden, Switzerland

[21] Appl. No.: 911,663

[22] Filed: Jun. 1, 1978

Related U.S. Application Data

[62] Division of Ser. No. 792,591, May 2, 1977, Pat. No. 4,126,383.

[30] Foreign Application Priority Data

Jun. 3, 1976 [CH]  Switzerland .................. 7003/76

[51] Int. Cl.² ..................... G02F 1/03; B32B 31/12
[52] U.S. Cl. ................... 156/281; 156/330; 156/332; 427/74; 427/75
[58] Field of Search ............... 427/74, 75, 162; 156/330, 332, 281; 264/2

[56] References Cited

U.S. PATENT DOCUMENTS

| | | | |
|---|---|---|---|
| 3,748,018 | 7/1973 | Borden | 350/338 |
| 3,864,905 | 2/1975 | Richardson | 350/345 X |
| 3,984,176 | 10/1976 | Hirai et al. | 350/338 |
| 3,984,564 | 11/1976 | Somogyi | 350/345 |
| 4,033,672 | 7/1977 | Dalmasso | 350/345 X |
| 4,036,550 | 7/1977 | Yih | 350/338 |
| 4,043,636 | 8/1977 | Eberhardt et al. | 350/345 |

Primary Examiner—James R. Hoffman
Attorney, Agent, or Firm—Oblon, Fisher, Spivak, McClelland & Maier

[57] ABSTRACT

A process for the manufacture of an electrooptical display device including a circuit board and a liquid crystal display cell mounted on the circuit board, including forming a circuit board having at least one light conducting region; disposing the liquid crystal display cell adjacent the light conducting region of the circuit board; locating at least one light emitting element in the circuit board for illuminating the light conducting region; and attaching a semi-transparent reflector to the liquid crystal cell; wherein at least part of the circuit board is manufactured by combining a reflecting layer, which is produced by the deposition of a reflective material on a substrate or on one side of a mesh, with a light diffusing substance, by embedding these two materials together in a transparent polyester or epoxy resin.

3 Claims, 4 Drawing Figures

4,218,281

MANUFACTURING PROCESS FOR AN ELECTROOPTIC DISPLAY DEVICE

This is a division of application Ser. No. 792,591, filed May 2, 1977, now U.S. Pat. No. 4,126,383.

BACKGROUND OF THE INVENTION

1. Field of the Invention

The present invention relates to an electrooptic display device and a process for its manufacture.

2. Description of the Prior Art

Electrooptical display devices have found application in various electronic instruments. The readability of passive liquid crystal displays, which emit no light of their own, is mainly determined by the brightness and the direction of the surrounding illumination. Additional illumination can be provided by building light sources into the display itself but this requires additional space which is generally not available in compact instruments such as electronic clocks, wrist watches and pocket calculators.

Other schemes are known that use prisms to change the direction of the surrounding illumination in order to improve the viewability of liquid crystal displays operating in the transmission mode (U.S. Pat. No. 3,838,909). This type of arrangement, however, is mainly intended for stationary displays and would also require more room than is generally available in compact, portable instruments.

SUMMARY OF THE INVENTION

Accordingly, one object of this invention is to create an electrooptic display device which requires little energy to operate, which occupies only a small space, and which can be read even when the surrounding illumination is very low.

These requirements are fulfilled by the present invention which comprises a display, which can be operated either in the transmission or reflection modes consisting of a liquid crystal display cell and a semitransparent reflector located in or on a circuit board. It is possible to build a very compact display device with built-in illumination by employing a circuit board which is at least partially light conducting. At least part of the circuit board of this invention is manufactured by combining a reflecting layer, which is produced by the partial evaporation of a reflective material on a substrate or the evaporation of a reflective material on one side of a mesh, with a light diffusing substance, and embedding these two materials together in a transparent polyester or epoxy resin. Metals such as aluminum, silver, gold, chromium, etc. are especially good materials to evaporate onto a substrate to produce a reflective layer.

BRIEF DESCRIPTION OF THE DRAWINGS

Further characteristics and details of this invention will become clear from the subsequent description based on the attached drawings.

DESCRIPTION OF THE PREFERRED EMBODIMENTS

Figure 1:
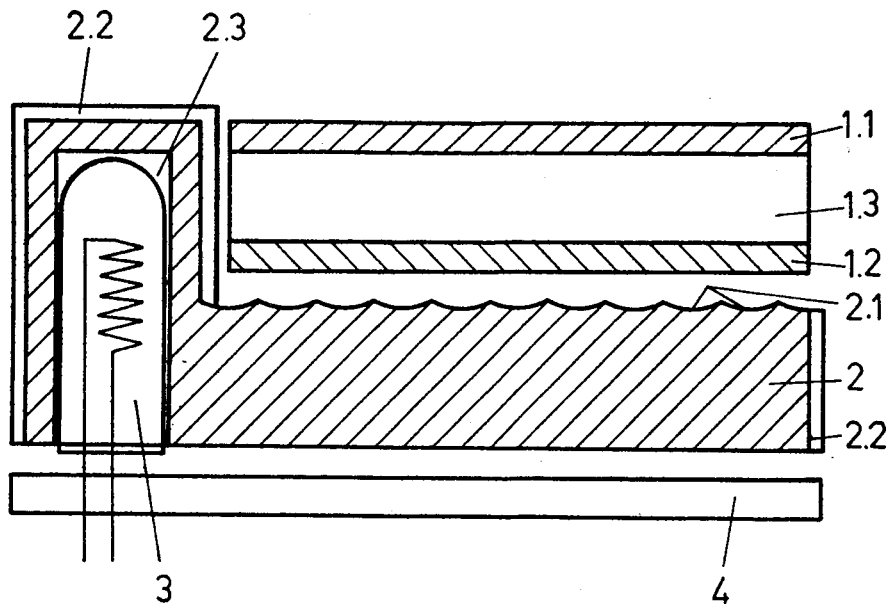
FIG. 1 shows a cross section of a prior art display device.
Figure 4:
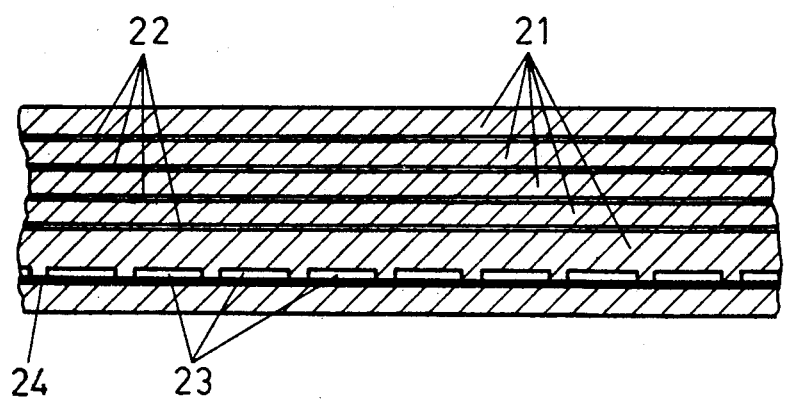
FIG. 4 shows the various layers comprising the circuit board in a preferred embodiment of the invention.

Referring now to the drawings, wherein like reference numerals designate identical or corresponding parts throughout the several views, and more particularly to FIG. 1 thereof, the prior art display device shown in FIG. 1 contains a commercially available liquid crystal cell 1, schematically illustrated by a front cell plate 1.1, a rear cell plate 1.2 on the reflector side of the device, and a layer of liquid crystalline material 1.3 located between the two cell plates 1.1 and 1.2. A transparent plastic element 2 is located underneath the liquid crystal cell 1, and its upper surface 2.1 is roughened to make it light diffusing. The remainder of the upper part of this plastic element is coated with white paint 2.2. Part of the plastic element is hollowed out 2.3 to receive a miniature lamp 3. The light that is emitted by the miniature lamp 3 is reflected by the white coating 2.2 and a reflector foil 4 located under the plastic element and emerges through the light diffusing surface 2.1 of the plastic element 2 to act as rear illumination for the liquid crystal 1. A disadvantage of this type of display device is the use of the rather thick light conducting plastic element 2 which requires a considerable increase in the amount of space required for the display.

The basic idea of this invention is to minimize the space required for the display device by incorporating all of the elements required to illuminate the liquid crystal cell 1 into a single element which already exists within the instrument.

Figure 2:
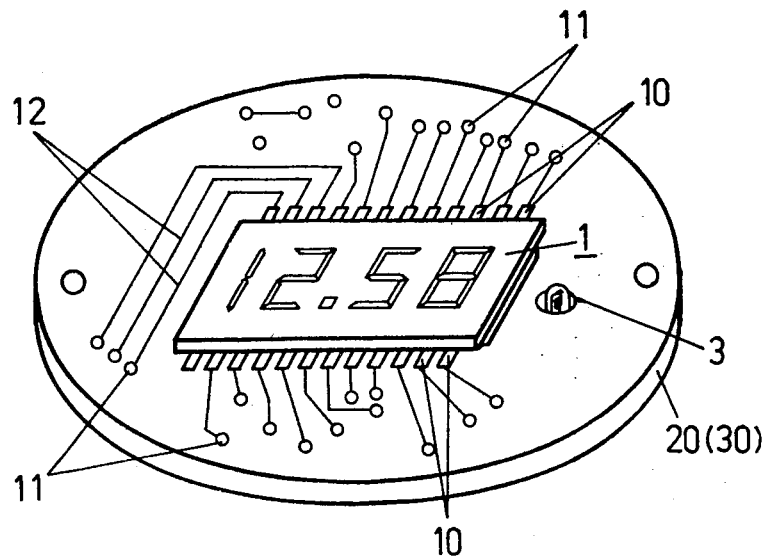
FIG. 2 shows a perspective view of a display device designed for a wrist watch.

FIG. 2 shows a liquid crystal display designed for a wrist watch whose illumination system is built directly into the circuit board 20 of the watch module. The conductors 12 connect the segment electrodes 10 of the liquid crystal cell 1 with the pins 11 of an integrated circuit 30 (not shown). A miniature lamp 3 is built into the circuit board 30 near its periphery where there is a light conducting region.

Figure 3:
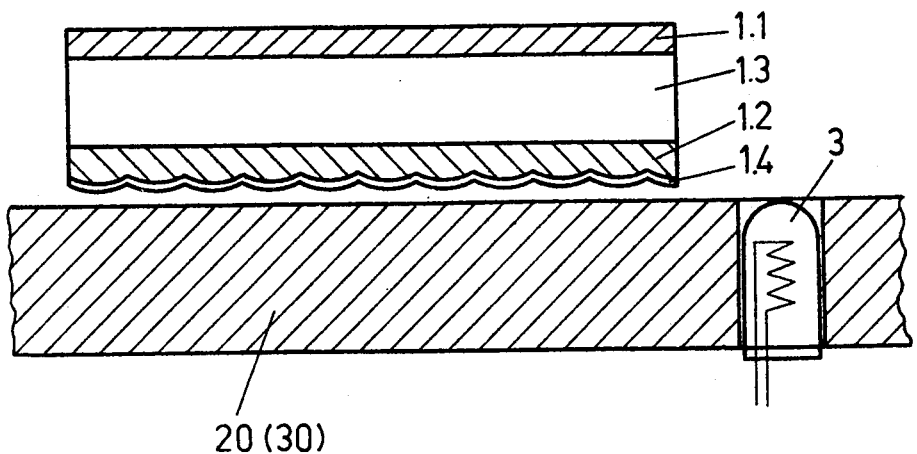
FIG. 3 shows a cross sectional view of the display device in FIG. 2.

FIG. 3 gives a simplified cross sectional view of the essential parts of this invention that are illustrated in FIG. 2. A semitransparent reflector 1.4 is, as is suggested in the German Patent Disclosure No. 25 31 372.8, attached directly to a polarizer which is cemented to the rear cell plate 1.2.

The display device depicted in FIGS. 2 and 3 functions as follows: as long as there is sufficient surrounding illumination the liquid crystal display is read in the reflection mode where the semitransparent reflector 1.4 reflects the incident light back through the cell to the observer. However, if the illumination is not bright enough, then the display can be read in the transmission mode by intermittently turning on the miniature lamp 3 so that its light will be conducted through at least part of the circuit board 20 and emerge through the region behind the semitransparent reflector 1.4 to illuminate the display from behind.

A description of the various embodiments of the circuit board 20 in this invention is given in the following sections.

The preferred embodiment of the circuit board 20 consists of six layers of light conducting polyester resin 21 with four sheets of fiberglass cloth 22 glued in between the first five polyester layers. A substrate 24, which has reflecting regions 23, is embedded between the last two polyester layers. The substrate 24 is a piece of 100 μm thick Mylar film, and the reflecting regions 23 consist of aluminum which is evaporated onto a substrate 24 through the square openings of a monofilament screen which is placed in direct contact with the substrate. An array of square reflecting regions 23 100 $\mu$m on a side, 0.5 $\mu$m thick and with 50 $\mu$m spacing is produced by this technique. The use of this type of reflector has the advantage that it does not short circuit the components placed on the circuit board since the reflecting regions are not connected to each other.

The use of masks for the selective evaporation of materials is well known and descriptions of this technique is given, for example, in "Handbook of Thin Film Technology", McGraw-Hill Book Company, 1970, chapters 7-8, 7-9, and 20-13. The masks described in this book, however, are wire grill masks, whereas the masks employed in the present invention are monofilament screens of the type commonly used in silk screen printing.

The reflecting substrates prepared as described in the previous sections make it possible to build display devices having exceptionally high contrast ratios even when operating in the transmission mode. Good results are obtained when the thickness of the evaporated layer lies between 0.1 and 1.0 $\mu$m.

The substrate 24 could also be a fine screen of Nylon or polyester. This alternate form has the advantage of not needing an evaporation mask to obtain the reflecting regions 23.

The circuit board 20 is assembled by pouring a hardening polyester resin over several layers of fiberglass cloth which have been displaced with respect to each other to prevent the appearance of Moire patterns. (See, for example, "Geometrical and Physical Optics", Longmans 1960, p. 259.)

Another embodiment which is especially simple to manufacture involves embedding scattering centers in the polyester resin in addition to the fiberglass cloth which is required for rigidity. Fine particles of MgO, $Al_2O_3$, $TiO_2$, and $BaSO_4$, or even tiny gas bubbles make suitable scattering centers. These scattering centers are embedded in the area of the circuit board that is directly underneath the liquid crystal cell 1 that is to be illuminated.

Instead of individual scattering centers, a light diffusing layer of woven material could also be employed (e.g. fiberglass cloth) whose refractive index is different from the refractive index of the surrounding medium (e.g. polyester resin). To improve the diffusing action it is recommended that at least the front side of the woven material be coated with a layer of white paint.

Another way to couple the light out of the circuit board at only the desired places, thus keeping the energy requirement to a minimum, is to glue a piece of mat plastic film to the surface of the circuit board 20 which lies underneath the liquid crystal cell. This could be accomplished, for example, by sticking a piece of translucent plastic tape at this location. The same effect could also be achieved by sand blasting this region of the circuit board, or by roughening it by some other means.

In thick circuit boards the miniature lamp could also be built directly into the board facing the light conducting region rather then being inserted at right angles to the board through a hole as is shown in FIGS. 2 and 3.

This invention works particularly well in combination with twisted nematic and so-called cholesteric guest-host display cells, but is is not restricted to these two particular display types.

Obviously, numerous modifications and variations of the present invention are possible in light of the above teachings. It is therefore to be understood that within the scope of the appended claims, the invention may be practiced otherwise than as specifically described.

What is claimed as new and desired to be secured by Letters Patent of the United States is:

1. A process for the manufacture of an electro-optical display device including a circuit board and a liquid crystal display cell mounted on said circuit board, comprising the steps of:
   forming a circuit board having at least one light conducting region;
   disposing said liquid crystal display cell adjacent the light conducting region of the circuit board;
   locating at least one light emitting element in the circuit board for illuminating the light conducting region;
   attaching a semi-transparent reflector to said liquid crystal cell;
   wherein said circuit board forming step further comprises,
   producing a reflective layer by depositing a reflective material on part of a substrate;
   providing a light diffusing layer;
   embedding together the reflecting layer and the light diffusing layer in a transparent resin to form a unit, said unit forming at least one integral portion of said circuit board.

2. The process for the manufacture of an electrooptic display device as recited in claim 1, wherein the reflective layer producing step includes the step of depositing a reflective material onto the substrate through the openings of a screen that is placed against the substrate.

3. A process for the manufacture of an electro-optical display device as is described in claim 1, of:
   producing a reflective layer by evaporating a reflective material on one side of a woven mesh;
   placing a light diffusing layer on the top of the reflecting layer;
   embedding together the reflecting layer with the light diffusing layer by means of a transparent resin, said unit forming a component of a circuit board.
   wherein the step of producing said reflective layer further comprises:
   producing said reflective layer by deposition of a reflective material on one side of a woven mesh.

* * * * *